(12) United States Patent
Pires

(10) Patent No.: US 6,411,726 B1
(45) Date of Patent: Jun. 25, 2002

(54) FINGERPRINT DETECTOR USING AN EL LAMP

(75) Inventor: David G. Pires, Phoenix, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/168,550

(22) Filed: Oct. 8, 1998

(51) Int. Cl.$^7$ .................................................. G06K 9/00
(52) U.S. Cl. ...................... 382/124; 313/506; 428/690
(58) Field of Search ................................ 382/124, 127; 283/68; 340/825.34; 428/690; 313/483–484, 493, 498, 502, 505, 506–509; 356/71

(56) References Cited

U.S. PATENT DOCUMENTS

| | | | |
|---|---|---|---|
| 4,956,577 A | * 9/1990 | Parker | 313/634 |
| 5,781,651 A | 7/1998 | Hsiao | 382/127 |
| 5,808,412 A | 9/1998 | Zovko | 313/509 |
| 6,002,786 A | * 12/1999 | Hallibert et al. | 382/124 |
| 6,091,838 A | 7/2000 | Burrows et al. | 382/114 |
| 6,175,641 B1 | * 1/2001 | Kallo et al. | 382/124 |

FOREIGN PATENT DOCUMENTS

| | | | | |
|---|---|---|---|---|
| SU | 797657 | * | 1/1981 | A61B/5/10 |
| WO | WO 99/00761 | * | 1/1981 | G06K/9/00 |
| WO | WO 99/00761 | * | 1/1999 | |
| WO | WO 99/12472 | * | 3/1999 | A61B/5/117 |
| WO | WO 99/27485 | * | 6/1999 | G06K/9/00 |

OTHER PUBLICATIONS

Derwent Abstract (XP–002080114) ; Abdullaev, G. et al; "Electroluminescent Cell—with Semiconductor Layer Made of Copper Sulfide", Jul. 15, 1982.*
Strassberg, D., "You are your password", *EDN*, May 7, 1998; pp. 47–58.
http://www.identix.com/TView.htm; "TouchView™ II", Fingerprint Image Capture Terminal; website accessed May 7, 1998.

* cited by examiner

*Primary Examiner*—Bhavesh Mehta
(74) *Attorney, Agent, or Firm*—Paul F. Wille

(57) ABSTRACT

Lamp materials, e.g. a phosphor layer and a dielectric layer, are roll coated onto a release layer. A photodetector is coated with a translucent conductive layer and the lamp materials are laminated to the transparent conductive layer. The release layer is removed and a protective coating is applied to the dielectric layer. A resin coating is optionally applied to the transparent conductive layer prior to lamination to improve adhesion. The protective coating can be incorporated into the lamp materials prior to lamination. The release layer can be coated by screen printing or other deposition technique rather than by roll coating.

8 Claims, 4 Drawing Sheets

FINGERPRINT DETECTOR USING AN EL LAMP

BACKGROUND

This invention relates to identification apparatus based upon biometrics and, in particular, to a photodetector having an integral EL lamp in which the rear electrode of the lamp is the fingertip of a person.

It has been a continuing problem to provide unique, secure means for identifying individuals, whether for security in a manufacturing plant or for identifying a party to an electronic business transaction. Thefts of a person's "identity" have been increasing as thieves become more sophisticated in exploiting modern technology. The unique physiological features of an individual, e.g. retina, fingerprint, voice, and auricle, have long been used for identification. The problem remains of providing an electronic identification system that exploits such unique features to provide a rapid, secure identification system.

It is known in the art to use an EL lamp for illuminating a fingerprint; U.S. Pat. No. 5,781,651 (Hsiao et al.). It is also known in the art that one can produce a luminous image of a fingerprint by omitting the rear electrode from an EL lamp and having a person touch the rear of the lamp to complete a circuit through the lamp. The current is very small and is not harmful. A series of bright lines are produced by the EL lamp, corresponding to the ridges of the person's fingerprint. Creating a durable lamp for this purpose has proven elusive, as has providing a suitable detector for converting the luminous image into data for a computer.

An EL lamp is essentially a capacitor having a dielectric layer between two conductive electrodes, one of which is transparent. The dielectric layer includes a phosphor powder or there is a separate layer of phosphor powder adjacent the dielectric layer. The phosphor powder radiates light in the presence of a strong electric field, using very little current.

A modern EL lamp is a thick film device, typically including a transparent substrate of polyester or polycarbonate material having a thickness of about 7.0 mils (0.178 mm.). A transparent, front electrode of indium tin oxide (ITO) or indium oxide is vacuum deposited onto the substrate to a thickness of 1000 Å or so. A phosphor layer is screen printed over the front electrode and a dielectric layer is screen printed over phosphor layer. A rear electrode, if present, is screen printed over the dielectric layer.

The light from a phosphor particle is radiated essentially in all directions, which is normally an advantage because an EL lamp is a diffuse, uniform light source. The spreading of the light causes problem with contrast and sharpness in a fine line image such as a fingerprint.

It is known to use an optical system to project the luminous image of a fingerprint onto a photodetector but an optical system considerably increases the cost of a fingerprint detector. One can electronically manipulate the image of a fingerprint to try to improve sharpness and contrast but such circuitry or software also increases the cost of a fingerprint detector. Even if a photodetector, such as a charge coupled device, were placed directly against an EL lamp, the light would spread sufficiently for the lines forming the fingerprint to be larger than the area of skin actually in contact with the lamp.

It is known in the art to make an EL lamp by laminating layers together. U.S. Pat. No. 4,560,902 (Kardon) discloses depositing a dielectric film on a sheet of aluminum foil, depositing a phosphor layer on a Mylar® sheet coated with indium tin oxide, and then laminating the two sheets together.

U.S. Pat. No. 5,469,109 (Mori) discloses laminating two coated, transparent sheets together wherein a first sheet includes a transparent electrode, a phosphor layer, and a dielectric layer and a second sheet includes an adhesive layer and a rear electrode overlying the adhesive layer. The adhesive layer is larger than the rear electrode and contacts the first sheet, enclosing the phosphor layer and the dielectric layer to seal the lamp.

In view of the foregoing, it is therefore an object of the invention to provide an EL lamp that creates a luminous image that faithfully represents a fine line image.

Another object of the invention is to provide biometric apparatus including an EL lamp closely coupled optically to a photodetector.

A further object of the invention is to improve image sharpness and contrast in a fingerprint detector including an EL lamp.

Another object of the invention is to provide a method for reliably making an EL lamp on a semiconductor substrate.

SUMMARY OF THE INVENTION

The foregoing objects are achieved by the invention in which lamp materials, e.g. a phosphor layer and a dielectric layer, are roll coated onto a release layer. A photodetector is coated with a translucent conductive layer and the lamp materials are laminated to the transparent conductive layer. The release layer is removed and a protective coating is applied to the dielectric layer. A resin coating is optionally applied to the transparent conductive layer prior to lamination to improve adhesion. The protective coating can be incorporated into the lamp materials prior to lamination. The release layer can be coated by screen printing or other deposition technique.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
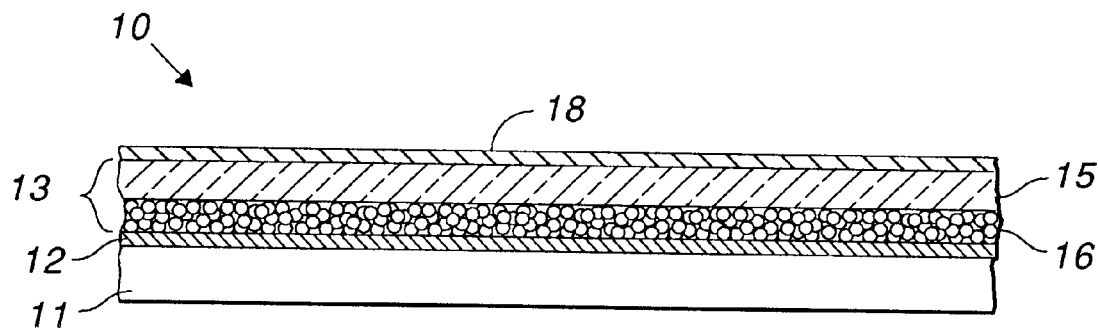
FIG. 1 is a cross-section of a typical EL lamp.

FIG. 1 is a cross-section of an EL lamp constructed in accordance with the prior art. The several layers are not shown in proportion or to scale. Lamp 10 includes transparent substrate 11 of polyester or polycarbonate material. Transparent electrode 12 overlies substrate 11 and includes indium tin oxide or indium oxide. Phosphor layer 16 overlies electrode 12 and dielectric layer 15 overlies the phosphor layer. The phosphor layer and the dielectric layer can be combined into a single layer, as indicated by reference number 13. Overlying dielectric layer 15 is rear electrode 18 containing conductive particles such as silver or carbon in a resin binder.

The inks used for the layers include a binder, a solvent, and a filler, wherein the filler determines the nature of the layer. A typical solvent is dimethyl-acetamide (DMAC) or ethylbutylacetate (EB acetate). The binder is typically a fluoropolymer such as polyvinylidene fluoride/hexafluoropropylene (PVDF/HFP), polyester, vinyl, or epoxy. A phosphor layer is typically screen printed from a slurry containing a solvent, a binder, and zinc sulphide particles. A dielectric layer is typically screen printed from a slurry containing a solvent, a binder, and barium titanate ($BaTiO_3$) particles. A rear (opaque) electrode is typically screen printed from a slurry containing a solvent, a binder, and conductive particles such as silver or carbon. Because the solvent and binder for each layer are chemically the same or similar, there is chemical compatibility and good adhesion between adjoining layers. Whether the layers are screen printed or roll coated affects the particular viscosity and composition of the inks used.

Figure 2:
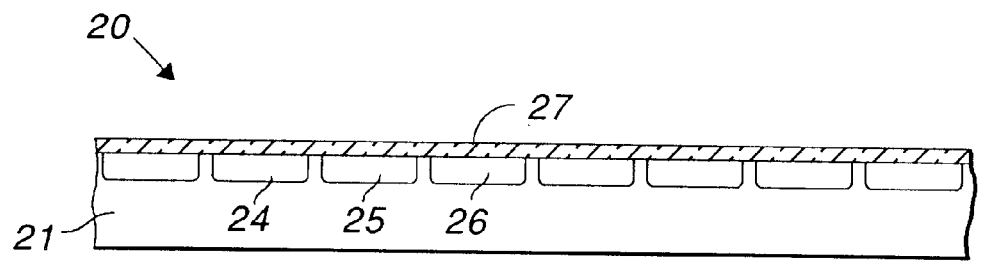
FIG. 2 is a cross-sectional representation of a charge coupled device.

FIG. 2 illustrates a charge coupled device 20 in cross-section, wherein semiconductor substrate 21 includes a plurality of active areas, such as areas 24, 25, and 26. As well known in the art, a charge coupled device is considerably more complex, including several structures formed in the semiconductor and deposited on the semiconductor, such as metallized layers connecting the active areas into an array from which an image is read as a variation in current. Overlying the array of active areas is passivation layer 27, which is typically glass ($SiO_2$).

Figure 3:
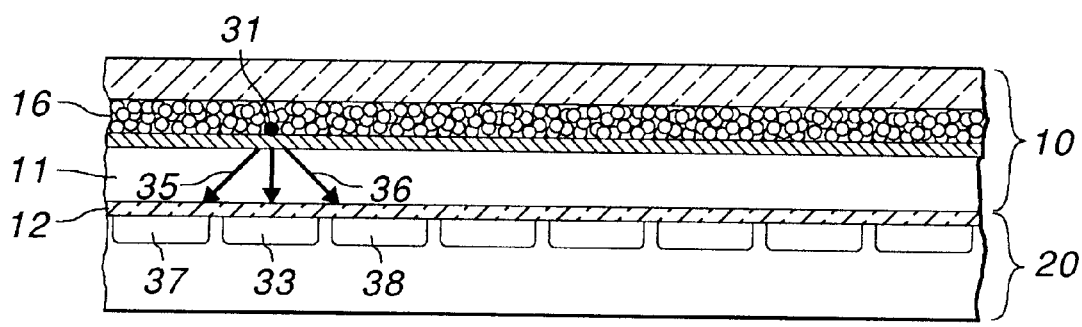
FIG. 3 is a cross-section of an EL lamp attached to a charge coupled device.

FIG. 3 illustrates the combination of the devices shown in FIGS. 1 and 2. Even though the devices are placed on top of each other, phosphor layer 16 is separated from the active areas in charge coupled device 20 by substrate 11, which is approximately 7.0 mils (0.178 mm.) thick. The ITO layer (1000 Å) is insignificant.

The thickness of substrate 11 is sufficient to permit light to spread, reducing contrast and sharpness. When phosphor particle 38 emits light, the light travels in all directions, including directly to active area 33 and to the adjoining areas, as indicated by arrows 35 and 36. The stray light reaching areas 37 and 38 causes the reduced contrast and reduced sharpness.

Figure 4:
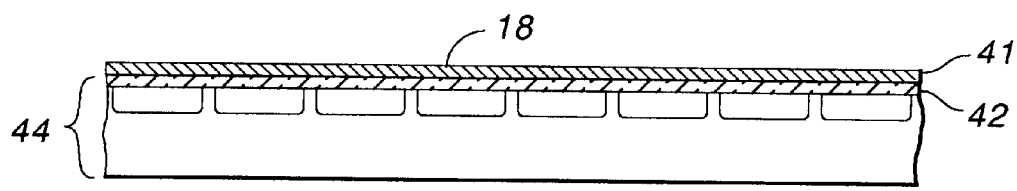
FIG. 4 illustrates coating a charge coupled device with a transparent, conductive layer.

In accordance with the invention, contrast and sharpness are improved by using charge coupled device 20 as a substrate for making a lamp. As illustrated in FIG. 4, ITO layer 41 is deposited on passivation layer 42 in charge coupled device 44; e.g. by sputtering. If necessary, passivation layer 42 is re-flowed prior to depositing the ITO to provide a smoother surface and to avoid discontinuities in the ITO. An additional smoothing layer of glass or other material can be used instead.

Figure 5:
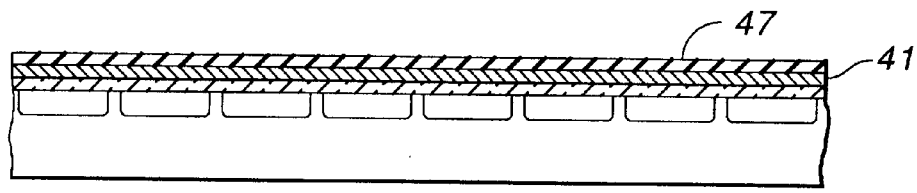
FIG. 5 illustrates depositing a resin adhesion layer on a charge coupled device.
Figure 6:
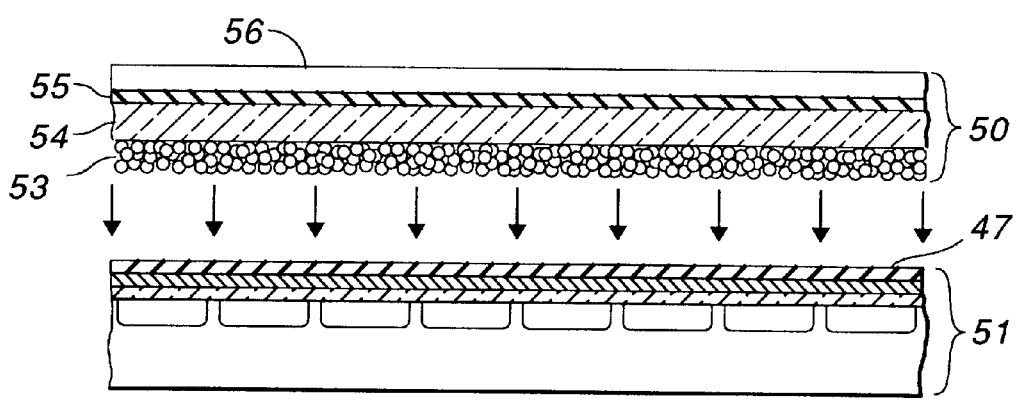
FIG. 6 illustrates laminating a phosphor layer to a charge coupled device.

As illustrated in FIG. 5, transparent resin layer 47 is applied to ITO layer 41, e.g. by roller, brush, or other suitable technique. As illustrated in FIG. 6, lamp materials 50 are laminated to subassembly 51, joining resin layer 47 and phosphor layer 53. The lamp materials are warmed and then pressed against the photodetector or are warmed while being pressed against the photodetector.

Lamp materials 50 include phosphor layer 53, dielectric layer 54, and protective layer 55 on release layer 56. The lamp materials are applied, in reverse order, to release layer 56, preferably by roll coating and preferably shortly prior to lamination. As described above, the layers are chemically similar and are similar to resin layer 47, thereby assuring good adhesion. Laminating shortly after depositing the lamp materials reduces the chance of contamination.

Layer 56 is a release paper or plastic to which ink will not adhere, such as silicone treated polyester or silicone treated paper. By depositing the lamp materials on a release layer, the materials are supported by a relatively flat, dimensionally stable substrate until they adhere to the charge coupled device. This prevents damage to the layers, particularly the phosphor layer. Damage to the phosphor layer can manifest itself in many forms, particularly as dark spots or bright spots. One of the advantages of an EL lamp is uniformity of light, i.e. a fingertip can be placed anywhere on the lamp and the resulting image should be the same.

Figure 7:
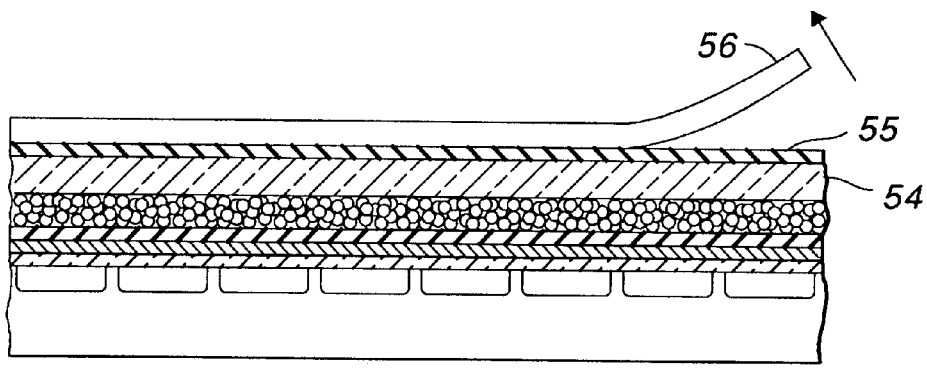
FIG. 7 illustrates removing the release layer from a dielectric layer.

After lamination, release layer 56 is removed, exposing protective layer 55, as illustrated in FIG. 7. Protective layer 55 is preferably a hard coat, such as UV curable acrylic or other material compatible with dielectric layer 54. Protective layer 55 can be sacrificial, i.e. worn away during use and then renewed, or relatively permanent, protected by additional layers such as waxes or conditioning liquids for providing a hydrophobic surface. A hydrophobic surface is desirable because a wet fingertip, in effect, short circuits the ridges and produces a glowing blob rather than a fingerprint.

Figure 8:
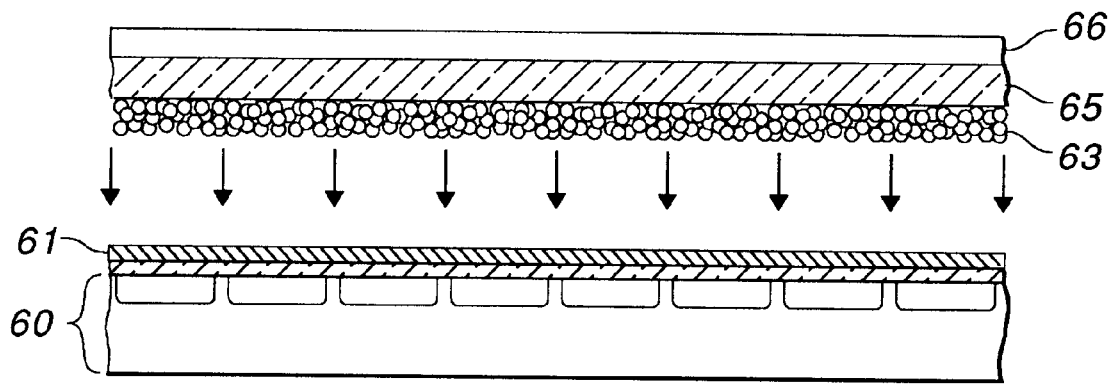
FIG. 8 illustrates laminating a phosphor layer to the charge coupled device.

FIG. 8 illustrates an electroluminescent fingerprint detector constructed in accordance with an alternative embodiment of the invention. Charge coupled device 60 is coated with ITO layer 61 but is not coated with a resin layer. Phosphor layer 63 is laminated directly to the ITO layer for joining the lamp materials to the charge coupled device.

The ink used to make phosphor layer 63 contains more binder than the ink used to produce phosphor layer 53 (FIG. 6) to provide good adhesion between the phosphor, which is relatively rough, and the ITO, which is relatively smooth.

Figure 9:
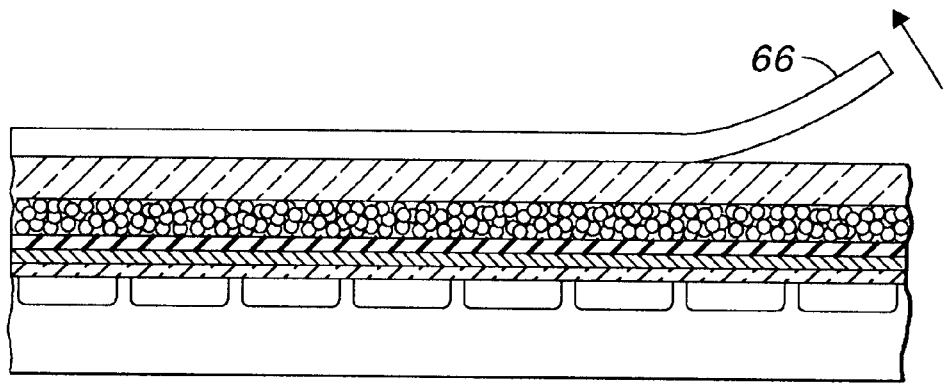
FIG. 9 illustrates peeling off the release layer.
Figure 10:
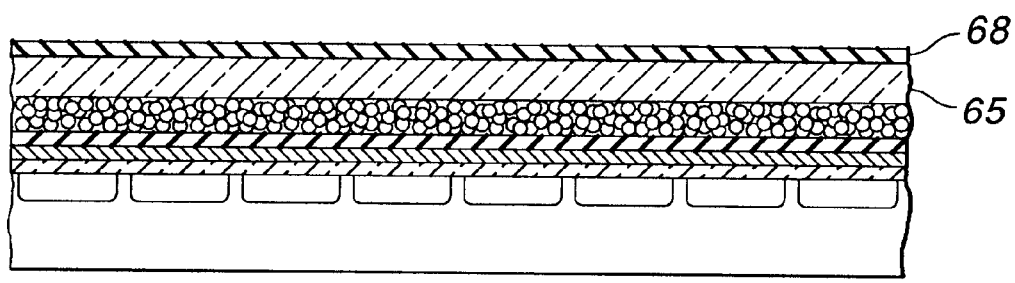
FIG. 10 illustrates adding a protective coating.

Dielectric layer 65 is applied directly to release layer 66. There is no protective layer at this point in the process. As illustrated in FIG. 9, release layer 66 is removed, revealing dielectric layer 65. Protective coating 68 (FIG. 10) is then applied to dielectric layer 65. A UV curable acrylic or other coating can be used. Coating 68 can be clear or opaque but cannot be conductive.

Figure 11:
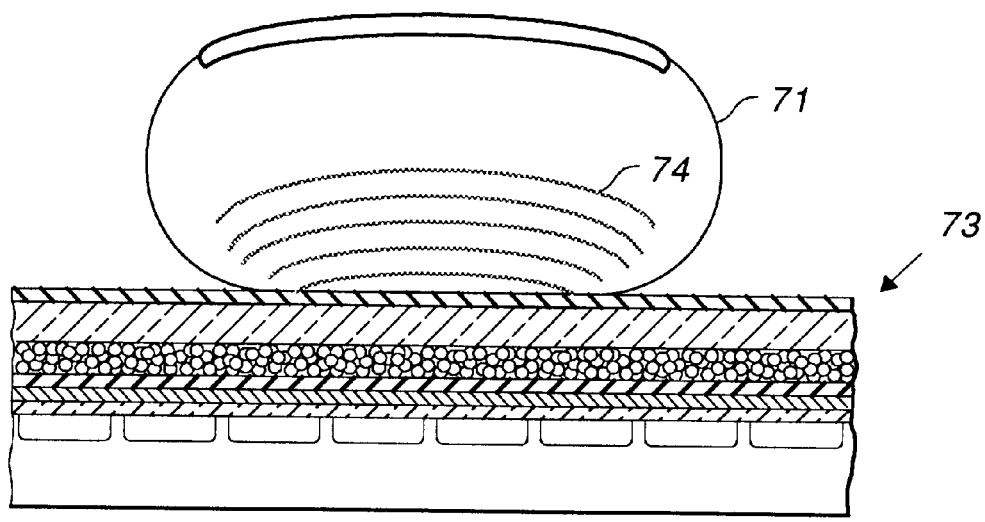
FIG. 11 illustrates the use of the electroluminescent fingerprint detector.
Figure 12:
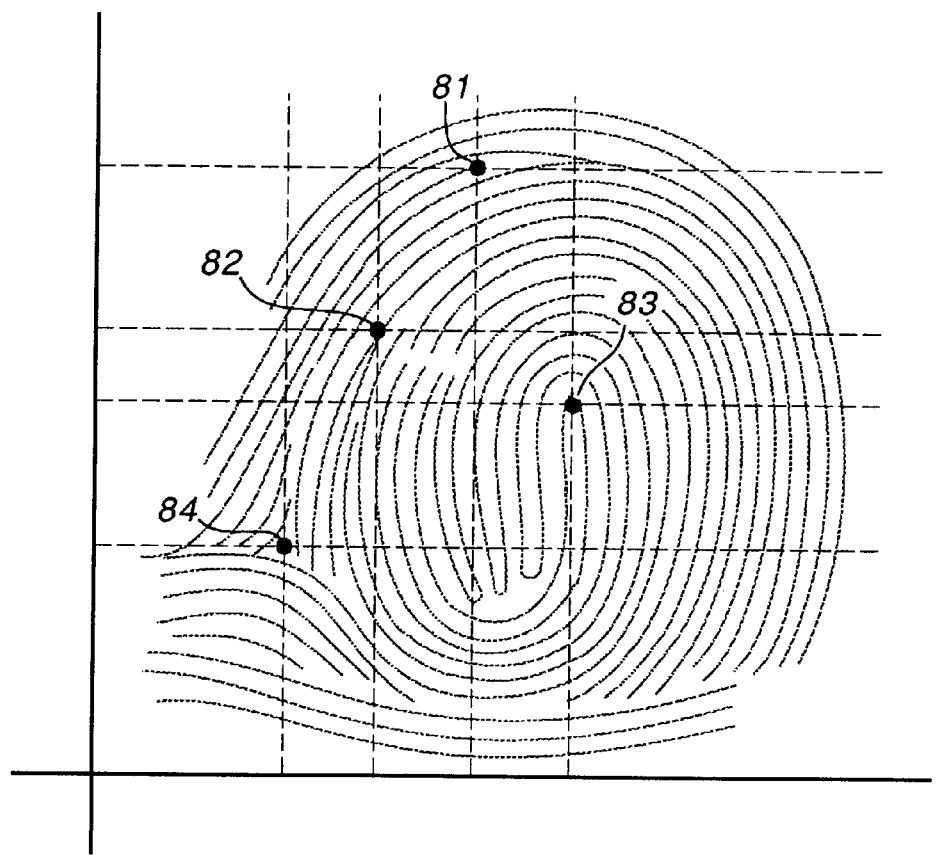
FIG. 12 illustrates an image of a fingerprint.

FIG. 11 illustrates the use of the detector. Fingertip 71 is placed on detector 73 and is slightly flattened. The fingertip may be pretreated with alcohol or other cleanser to remove body oils and other materials. Because the skin in each person's fingerprint contains ridges 74, only the ridges actually make contact with the detector, producing a fine line image of the fingerprint, as illustrated in FIG. 12.

The output from detector 73 (FIG. 11) is coupled to a computer (not shown) that analyzes the data for "minutiae." A minutia is a feature of the fingerprint, such as the termination of a valley indicated at dot 81, a Y or fork in a valley as indicated at dot 82, the end of a loop as indicated at dot 83, or a delta as indicated at dot 84. Many more such features are found by pattern recognition software and the spatial arrangement of the minutiae defines the identification pattern for a person. Verifying a person's identity by his fingerprint may require finding less than all the same minutiae in a subsequent scan of the person's fingertip.

The invention thus provides an EL lamp that creates a luminous image that faithfully represents a fine line image.

The EL lamp is closely coupled optically to a photodetector, thereby improving the sharpness and contrast of the image. The lamp materials are supported on a substrate until after the materials are attached to the photodetector.

Having thus described the invention, it will be apparent to those of skill in the art that various modifications can be made within the scope of the invention. For example, the lamp materials can be prepared by screen printing or other coating technique instead of roll coating. Roll coating provides a finer grain than screen printing, further enhancing the resulting image, but the slight degradation from screen printing is tolerable, particularly if one does not own roll coating apparatus. Although specifically described as apparatus for producing an electro-optical image of a fingerprint, it is understood that the invention can be used for any biometric application wherein the body acts as one electrode of an EL lamp.

What is claimed as the invention is:

1. A method for making a biometric device wherein a body acts as one electrode of an EL lamp, said method comprising the steps of:

coating a photodetector with a transparent electrode;

coating a substrate with EL lamp materials;

laminating the lamp materials to the transparent electrode; and removing the substrate.

2. The method as set forth in claim 1 wherein the step of coating a substrate includes the steps of:

coating the substrate with a dielectric layer; and coating the dielectric layer with a phosphor layer.

3. The method as set forth in claim 1 wherein the step of coating a substrate includes the steps of:

roll coating the substrate with a dielectric layer; and roll coating the dielectric layer with a phosphor layer.

4. The method as set forth in claim 2 wherein the substrate is first coated with a protective layer.

5. The method as set forth in claim 1 wherein the removing step is followed by the step of coating the lamp materials with a protective layer.

6. The method as set forth in claim 1 wherein the photodetector is passivated and said step of coating the photodetector is preceded by the step of smoothing the passivation layer on the photodetector.

7. The method as set forth in claim 1 wherein said step of coating the photodetector is followed by the step of coating the transparent electrode with a transparent resin layer.

8. A fingerprint detector comprising:

a photodetector including a passivation layer as the outermost layer;

a transparent, conductive layer overlying said passivation layer without an intervening substrate;

a phosphor layer overlying said transparent, conductive layer;

a dielectric layer overlying said phosphor layer;

a protective layer overlying said dielectric layer;

wherein a person's fingertip touches said protective layer and serves as a rear electrode to the electroluminescent lamp formed by the fingertip, the dielectric layer, the phosphor layer, and the transparent, conductive layer.

* * * * *